United States Patent [19]
Dauber et al.

[11] Patent Number: 5,538,545
[45] Date of Patent: Jul. 23, 1996

[54] NONPARTICULATING ADSORBENT RECIRCULATING FILTER

[75] Inventors: Edwin G. Dauber, Chesapeake City, Md.; Douglas B. McKenna, Dover; Michael S. Winterling, Newark, both of Del.

[73] Assignee: W. L. Gore & Associates, Newark, Del.

[21] Appl. No.: 334,827

[22] Filed: Nov. 4, 1994

[51] Int. Cl.⁶ .................................................. B01D 53/04
[52] U.S. Cl. ........................ 96/153; 96/154; 55/385.6; 55/485; 55/487; 55/514; 55/524; 55/528
[58] Field of Search ............................... 55/385.1, 385.6, 55/485–489, 514, 524, 528; 96/158, 154

[56] References Cited

U.S. PATENT DOCUMENTS

| | | | |
|---|---|---|---|
| 2,196,021 | 4/1940 | Merrill | 96/154 X |
| 3,201,620 | 8/1965 | Ballentine | 55/524 X |
| 3,953,566 | 4/1976 | Gore | 264/288 |
| 4,093,437 | 6/1978 | Ichihara et al. | 55/524 X |
| 4,164,400 | 8/1979 | Wald | 55/524 X |
| 4,181,513 | 1/1980 | Fukuda et al. | 55/524 X |
| 4,211,661 | 7/1980 | Perry | 55/524 X |
| 4,250,172 | 2/1981 | Mutzenberg et al. | 96/154 X |
| 4,424,248 | 1/1984 | Tesch et al. | 96/154 X |
| 4,486,482 | 12/1984 | Kobayashi et al. | 96/154 X |
| 4,600,420 | 7/1986 | Wydeven et al. | 55/514 X |
| 4,816,328 | 3/1989 | Saville et al. | 55/524 X |
| 4,830,643 | 5/1989 | Sassa et al. | 55/316 |
| 4,863,499 | 9/1989 | Osendorf | 55/316 |
| 4,902,423 | 2/1990 | Bacino | 210/500.36 |
| 4,985,296 | 1/1991 | Mortimer, Jr. | 428/220 |
| 5,030,260 | 7/1991 | Beck et al. | 55/316 |
| 5,096,473 | 3/1992 | Sassa et al. | 55/514 X |
| 5,124,856 | 6/1992 | Brown et al. | 360/97.03 |
| 5,221,573 | 6/1993 | Baigas, Jr. | 55/524 X |
| 5,417,743 | 5/1995 | Dauber | 55/385.6 X |

FOREIGN PATENT DOCUMENTS

| | | |
|---|---|---|
| 0090073 | 10/1983 | European Pat. Off. |
| 55-132615 | 10/1980 | Japan ..................... 55/514 |
| 60-161712 | 8/1985 | Japan . |
| 3238011 | 10/1991 | Japan . |
| 5200284 | 8/1993 | Japan . |
| W091/14496 | 10/1991 | WIPO . |

*Primary Examiner*—Robert Spitzer
*Attorney, Agent, or Firm*—Victor M. Genco, Jr

[57] ABSTRACT

The present invention is an improved sorbent filter for use in both particulate filtration and absorption of gaseous contaminants in a variety of applications, such as for filtration in a computer disk drive. The filter of the present invention provides previously unavailable levels of combined particulate filtration and contaminant sorption while being capable of ready reconditioning (such as through washing with D.I. water).

18 Claims, 6 Drawing Sheets

NONPARTICULATING ADSORBENT RECIRCULATING FILTER

FIELD OF THE INVENTION

This invention relates to a device for filtering particulates and vapor phase contaminants from a confined environment such as electronic or optical devices susceptible to contamination (e.g., computer disk drives).

DESCRIPTION OF RELATED ART

Many enclosures that contain sensitive instrumentation must maintain very clean environments in order to operate properly. Examples include: enclosures with sensitive optical surfaces, or electronic connections that are sensitive to particulates and gaseous contaminants which can interfere with mechanical, optical, or electrical operation; data recording devices, such as computer hard disk drives that are sensitive to particles, organic vapors, and corrosive vapors; and electronic control boxes such as those used in automobiles and industrial applications that can be sensitive to particles, moisture buildup, and corrosion as well as contamination from fluids and vapors. Contamination in such enclosures originate from both inside and outside the enclosures. For example, in computer hard drives, damage may result from external contaminates as well as from particles and outgassing generated from internal sources.

One serious contamination-related failure mechanism in computer disk drives is static friction or "stiction." Stiction is the adhesion of a drive head to a disk while the disk is stopped. Newer high density disks are more sensitive to contamination caused stiction because they are smoother and only thin layers of lubricants are used. Contaminants on the disk change the surface energy and the adhesive forces between the head and disk which cause stiction. Also vapors that condense in the gap between the head and disk can cause stiction. Further exacerbating these effects are the newer lower energy, lower torque motors being used in smaller disk drives for portable computers.

Another serious contamination-related failure mechanism in computer disk drives are head crashes. Head crashes can occur when particles get into the head-disk interface. Newer high density drives have 2 micro inches or less flying heights or spacing between the head and disk during operation and typically have disks rotating 5400 revolutions per minute or greater. Even submicron sized particles can be a problem, causing the head to crash into the particle or the disk after flying over a particle, bringing the drive to an abrupt failure mode.

In addition, disk drives must be protected against a large number of contaminants in the surrounding environment that can penetrate the drive. This is true for drives used in small to medium sized computer systems which may not be used in the typical data processing environment and is especially true in drives that are removable and portable to any environment such as disk drives that are used in laptop computers or in Personal Computer Memory Card International Association (PCMCIA) slots.

Filtration devices to keep particles from entering these enclosures are well known. They may consist of a filtration media held in place by a housing of polycarbonate, acrylonitrile butadiene styrene (ABS), or some other material; or they may consist of a filtration media in the form of a self-adhesive disk utilizing a layer or layers of pressure sensitive adhesive. These devices are mounted and sealed over a vent hole in the enclosure to filter particulates from the air entering the drive. Filtration performance depends not only on the filter having a high filtration efficiency but also on having a low resistance to air flow so that unfiltered air does not leak into the enclosure through a gasket or seam instead of entering through the filter. Those filters work well for particulates but do not address the problems from vapor phase contaminants.

Combination sorbent breather filters to keep particulates and vapors from entering enclosures are also well known. These can be made by filling a cartridge of polycarbonate, ABS, or similar material with sorbent and securing filter media on both ends of the cartridge. Examples of such filters are described in U.S. Pat. Nos. 4,863,499 issued to Osendorf (an anti-diffusion chemical breather assembly for disk drives with filter media having a layer impregnated with activated charcoal granules); 5,030,260 issued to Beck et al. (a disk drive breather filter including an assembly with an extended diffusion path); and 5,124,856 issued to Brown et al. (a unitary filter medium with impregnated activated carbon filters to protect against organic and corrosive pollutants). Unfortunately, many of these designs are too large and take up too much space in today's miniaturized drives.

A second combination adsorbent breather filter is also well known that encapsulates the adsorbent material such as an impregnated activated carbon polytetrafluoroethylene (PTFE) composite layer between two layers of filter media and is applied over a hole in the enclosure with a layer of pressure sensitive adhesive. These filters work well and are of a size that can be used in today's small drives but are typically designed to filter air coming into the drive. Thus, the adsorbent is typically desired to adsorb both organic and corrosive vapors from the outside environment and will filter particulates only from air coming into or leaving the drive. Particles and vapor phase outgassing contaminants are also generated inside the drive.

Internal particulate filters or recirculation filters are also well known. Typically, they are pieces of filter media, such as expanded PTFE membrane laminated to a polyester nonwoven backing material or pillows of electret electrostatic filter media, that are pressure fitted into slots or "C" channels and are placed in the active air stream such as near the rotating disks in a computer hard disk drive or in front of a fan in electronic control cabinets, etc. Alternatively, the filter media can be framed in a plastic frame. These filters work well for particulate removal of internally generated particles but do not address the problem of internally generated vapor phase contaminants.

Internal adsorbent filters are also well known. One example is described in U.S. Pat. No. 4,830,643 issued to Sassa et al. This patent teaches a sorbent filter where a powdered sorbent or sorbent mixture is encapsulated in an outer expanded PTFE tube. This filter is manufactured by W. L. Gore & Associates, Inc., Elkton, Md. and is commercially available under the trademark GORE-SORBER® module. While this is highly effective at collecting vapor phase contaminants, it is currently only available in large and medium sizes (e.g., like filter volumes down to about 3 cc). In its present form, this filter is limited in its ability to address the growing needs for even smaller and more compact sorbent filters.

A second well known internal adsorbent assembly incorporates a layer of adsorbent such as activated carbon/PTFE composite between an encapsulating filter layer and layer of pressure sensitive adhesive. The pressure sensitive adhesive helps encapsulate the adsorbent as well as provides a means of mounting the adsorbent assembly on an interior wall in the enclosure.

A third internal adsorbent assembly incorporates a layer of adsorbent such as activated carbon/PTFE composite, between two layers of filter media. Alternately, the adsorbent is wrapped in a layer of filter media and can be installed between slots or "C" channels much the way a recirculation filter is installed but without much real airflow through the filter.

All of these internal adsorbent filters work well at adsorbing vapor phase contaminants but do not filter particulates very well. They can collect particles by impaction of particles onto the filter or by diffusion of particles onto the filter but do not perform nearly as well as standard recirculation filters.

A newly introduced adsorbent recirculation filter that incorporated activated carbon beads glued to a nonwoven carrier that is sandwiched between two layers of electret filter material and two layers of plastic support screen is also available. This filter provides some sorbent protection at the sacrifice of some filtration effectiveness as it adds some resistance to airflow to the filter.

Furthermore, the materials used have a high contamination level and high nonvolatile residue. The adhesive used to hold the carbon to the nonwoven also blocks some of the carbon pores reducing its effectiveness. Another issue in today's drives is contamination due to corrosive ions such as chlorine or sulfur dioxide. When the present filters were washed in deionized (D.I.) water to remove these ions, the filter fell apart, making it unacceptable in today's sensitive disk drive environments. The carbon bead can also particulate small carbon particles which could in time come out of the filter, especially if electrostatic charge diminishes with time or moisture.

What is needed is an improved dual function adsorbent recirculation filter that has good filtration performance for particulates, good performance for adsorbing vapor phase contaminants, is clean or very low in particulating and out-gassing, and is washable to remove ionic contamination. Accordingly, it is the primary purpose of the present invention to provide such an improved dual function adsorbent recirculation filter.

SUMMARY OF THE INVENTION

The present invention is an improved adsorbent recirculation filter that is extremely low in outgassing and particulation, has good filtration and adsorption performance, and is washable to remove ionic contamination.

A preferred embodiment of the present invention comprises a sorbent core of sorbent/PTFE composite that is needled with 0.6 mm diameter needles to improve air flow through the media that is sandwiched between two layers of filter media and optional support layers. The preferred filter media are highly expanded PTFE membrane or a triboelectric filter media of PTFE and polyamide fibers with either a polyester or polypropylene support layer or layers. This bonded construction forms a clean good performing particulate and vapor phase contaminant filter that is washable in deionized water to remove ionic contaminants and, as such, satisfies the existing need in the industry.

BRIEF DESCRIPTION OF THE DRAWINGS

The operation of the present invention should become apparent from the following description when considered in conjunction with the following drawings, in which.

DETAILED DESCRIPTION OF THE INVENTION

The present invention is an improved sorbent recirculation filter capable of removing particulate and vapor phase contaminants from within an enclosure to protect sensitive equipment present within the interior of the enclosure. The present invention is clean, in that it is very low in outgassing or nonvolatile residues, low in particulation, and washable to remove ionic contamination from the surface of the filter. As the term "sorbent" is used herein, it is intended to include any form of material used to remove gaseous contaminants, whether by absorption, adsorption, catalysts, or ion exchange.

The filter of the present invention differs significantly from other adsorbent recirculation filters. The filter of the present invention achieves a very high loading of sorbent material in a small space and prevents dusting from being generated during manufacturing. This can be accomplished by employing polytetrafluoroethylene (PTFE) as a matrix for the composite adsorbent layer. The PTFE matrix may be produced in accordance with U.S. Pat. No. 3,953,566 to Gore, incorporated by reference. Additionally, the adsorbent layer is totally contained within the filter cover layers, and the filter cover layers are adequately supported and protected by the outer support layer or layers. The materials of construction are very clean and low in outgassing and the encapsulation of the sorbent makes the filter low in particulation. The filter is washable to be able to remove ionic contamination and in particular is washable to the extent that water soluble salts often added to activated carbon to be able to chemically adsorb acid gases will not be washed off because of the hydrophobicity of the PTFE membranes and composite structures.

Various examples of the present invention can be described and illustrated in the accompanying drawings and discussions.

Figure 1A:
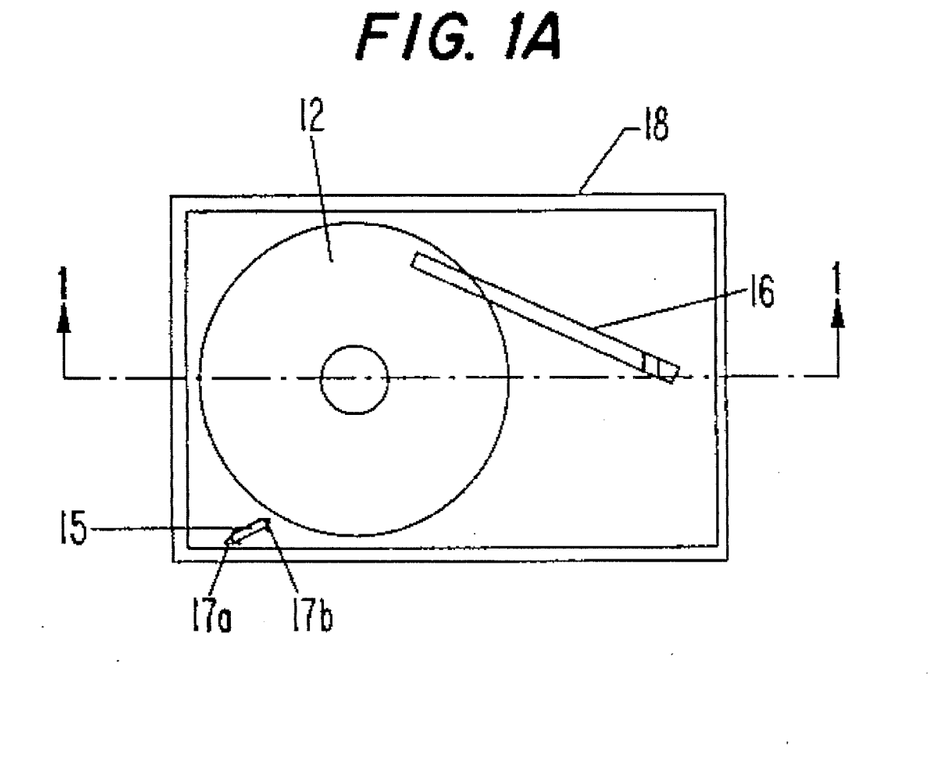
FIG. 1A is a top view of one embodiment of the present invention 15 positioned in a computer disk drive assembly.
Figure 1B:
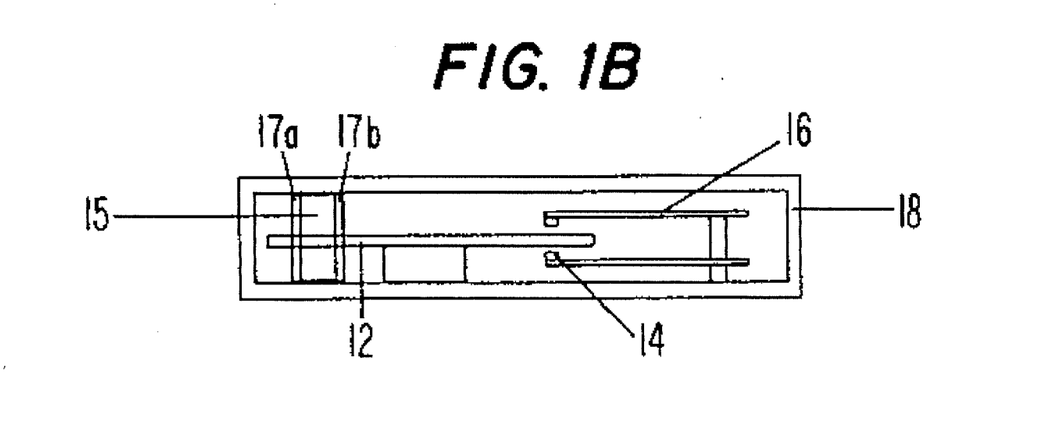
FIG. 1B is a cross-sectional view along line 1—1 of FIG. 1A.

FIGS. 1A and 1B show an example of the placement of a filter assembly 15 of the present invention mounted in a conventional disk drive assembly 18. As can be seen, the filter assembly of the present invention is small enough that it can be placed virtually anywhere in the disk drive assembly 18 and is typically put into any area of high air flow generated from a spinning data storage disk or disks 12. This forces air through the filter effecting particulate filtration and gives greater access of the adsorbent to the vapor contaminants. The adsorption of the vapor phase contaminants is through a diffusion into the pore structure of the adsorbent, but a thorough mixing of the air increases access of adsorbent to the vaporous contaminants and can impact speed of adsorption. Typically in disk drives, the filter would be held in place with brackets or "C" channels 17A and 17B as shown. The filter may be held in place through any suitable means, including by adhesive or by framing with a plastic frame and held in place by bolting the plastic frame to the housing. The present invention can also be used in enclosures where air is moved with the use of a fan in which case the filter can be mounted in or next to the fan housing. Alternatively, the filter could be used as a diffusion barrier in an enclosure separating sensitive equipment from contamination sources while allowing free pressure equilibration throughout the sections of the enclosure.

Other conventional elements shown in FIGS. 1A and 1B are the read/write heads 14 and the positioning armatures 16.

Figure 2A:
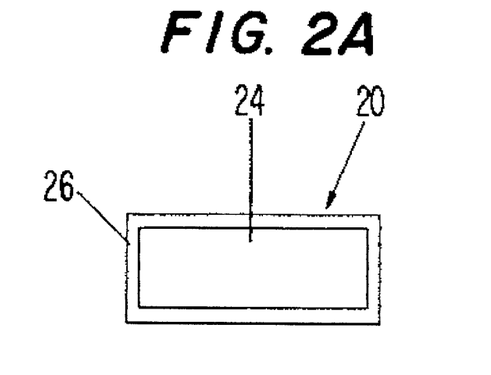
FIG. 2A is a side view of the present invention where the outside of the filter is represented.
Figure 2B:
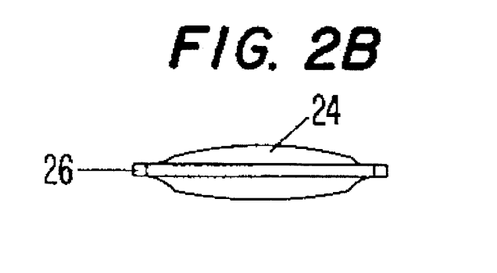
FIG. 2B is a top view of the invention shown in FIG. 2A.
Figure 2C:
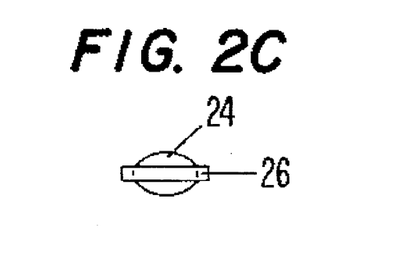
FIG. 2C is an end view of the invention shown in FIG. 2A.

As shown in FIGS. 2A, 2B and 2C, the filter 20 of the present invention has a perimeter seal 26 around the filter which seals the cover layers together and encapsulates the adsorbent core layer with the filter layers. The active air flow region 24 of the filter is inside this perimeter seal and is where the filtration takes place. The perimeter seal 26 also adds some rigidity to the filter and aids in mounting the filter in the typical "C" channel mounting configuration as shown in FIG. 1A.

Figure 4A:
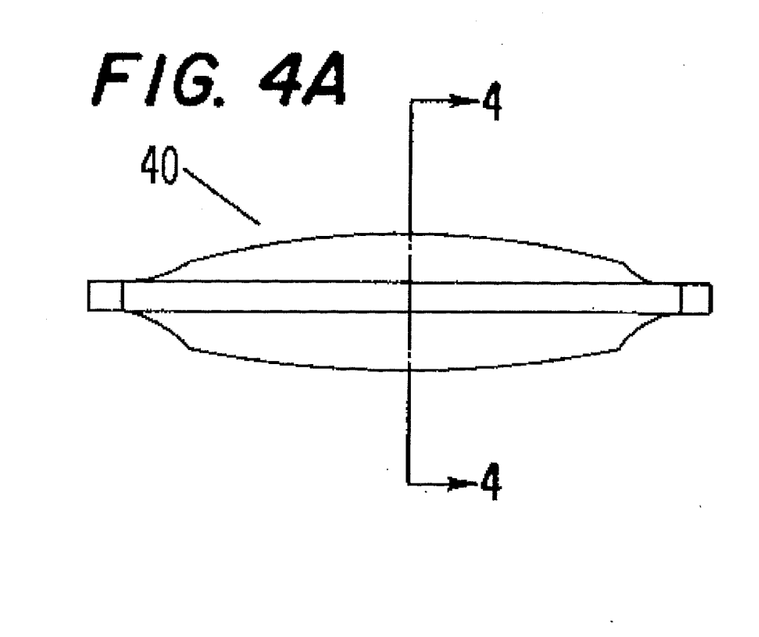
FIG. 4A is again a top view of the invention similar to FIG. 2B.
Figure 4B:
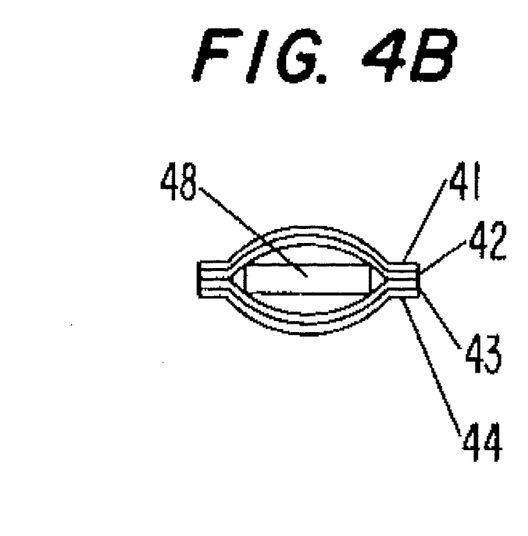
FIG. 4B is a cross-sectional view along line 4—4 of FIG. 4A showing the layers involved in the present invention.

FIG. 4A is similar to FIG. 2B and FIG. 4B is a cross-sectional view of FIG. 4A along line 4—4 showing the layered construction of the invention. The inner layer 48 is the adsorbent layer. Layers 42 and 43 are the filter media layer or layers as the filter media could be a laminated or unlaminated filter media and support layer as in an expanded PTFE membrane and nonwoven polyester combination. Layers 41 and 44 are the outer cover layers that protect the filter layers. Depending upon the filter media used, layers 41 and 44 may be used to control fibers from protruding from the filter media or filter support media.

Figure 3:
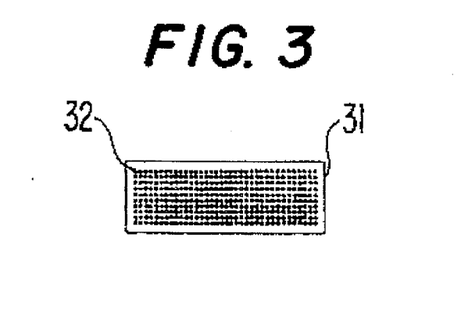
FIG. 3 is a side view of the center layer of the invention which is a needled layer of an adsorbent/PTFE composite layer.

FIG. 3 is a side view of the preferred adsorbent layer where the sorbent core 31 is a composite of activated carbon and PTFE that has been needled with needle holes 32 to improve airflow through the matrix. A preferred embodiment of the sorbent core 31 utilizes a sorbent filled PTFE sheet wherein the sorbent particles are entrapped within the recular PTFE structure, as taught by U.S. Pat. No. 4,985,296 issued to Mortimer, Jr., incorporated by reference. Ideally, particles are packed in a multi-model (e.g., bi-model or tri-model) manner with particles of different sizes interspersed around one another to fill as much of the available void space between particles as is possible, so as to maximize the amount of active material contained in the core. This technique also allows a number of sorbents to be filled into a single layer. The core is then needled to allow air flow through the adsorbent layer. This increases the airflow which ultimately improves the particle filtration of the surrounding filter media and also allows more air flow access to the sorbent material. As stated earlier, the sorbent filtration is by diffusion into the internal pore structure of the sorbent material.

As the term "needled" is used herein, it is intended to include any structure having small holes embedded therethrough so as to improve air flow through the structure. Needling is preferably performed with holes being made rapidly using automatic equipment and needles having a diameter of 0.1 to 3.0 millimeters.

Using PTFE as a binder material for the core imparts a number of additional advantages to this improved filter construction. PTFE is hydrophobic. Some adsorbents used in industry use a water soluble salt to impregnate a physical adsorbent such as activated carbon to provide a chemical adsorbent with a large active surface area. By impregnating the carbon in the PTFE/adsorbent matrix, it makes the final matrix waterproof, so that D.I. water can come into contact with the sorbent core layer and not penetrate the matrix. Thus, the salt treatment is not susceptible to removal by water washing. Ionic contamination has become a big concern for corrosion susceptible apparatus, such as computer disk drives. Ions of concern, such as chlorine and sulfur dioxide, are readily soluble in water, and thus a deionized water wash has become routine for many components used within the drive. The filter construction of the present invention is believed to be the only adsorbent recirculation filter construction that can use water soluble salt treated adsorbents incorporated into the adsorbent layer that can withstand subsequent washing without loss of adsorbent treatment and effectiveness.

Additionally, PTFE is a nonlinting, nonoutgassing inert binder that effectively reduces dusting of sorbent material during the manufacture and during the life of the filter. This material can also be made in a relatively thin, highly loaded material, per U.S. Pat. No. 4,985,296, that can allow thin final constructions with high sorbent content. The PTFE/sorbent composite can easily be made in thicknesses from less than 0.001" to 0.250" and greater allowing a great deal of flexibility in finished filter thicknesses and sorbent loading. Additionally, sorbent densities approximating 80–90% of full density are possible with multi-model packing and physical compression, so that maximum sorbent material can be packed per unit volume. The use of PTFE as the binding element also does not block the sorbent pores as do binders such as acrylics, melted plastic resins, etc.

Examples of sorbent materials that may be contained within the sorbent layer include: physisorbers (e.g., silica gel, activated carbon, activated alumina, molecular sieves, etc.); chemisorbers (e.g., potassium permanganate, calcium carbonate, calcium sulfate, sodium carbonate, sodium hydroxide, calcium hydroxide, powdered metals or other reactants for scavenging gas phase contaminants); ion exchange materials; catalytic fillers; as well as mixtures of these materials. For some applications, it may be desirable to employ multiple layers of sorbent materials, with each layer containing different sorbents to selectively remove different contaminants as they pass through the filter.

One preferred filter media to encapsulate the adsorbent layer is a layer of expanded PTFE membrane made in accordance to U.S. Pat. No. 4,902,423 issued to Bacino et al., incorporated by reference. This filter media would be structurally supported by a layer of woven, nonwoven, or expanded porous material such as polyester, polypropylene, polyamide, etc. This filter media has several advantages. It can be made very highly permeable, with resistances to air flow of less than 1.0 mm $H_2O$ @ 10.5 feet per minute (3.2 meters per minute) and still retain some water resistance such that water washing of finished filters with sorbent cores susceptible to damage by water can be done.

The particle filtration efficiency of this highly expanded membrane is also very good (e.g., in excess of 55% at 0.3

μm) which provides good particle filtration and adsorbent containment. A preferred support layer is a Reemay 2014 polyester nonwoven, 1.0 oz/yd$^2$ available from Reemay, Inc., Old Hickory, Tenn.

A second preferred filter media to encapsulate the adsorbent layer is a layer of triboelectric material made of PTFE and polyamide fibers such as that commercially available from W. L. Gore and Associates, Inc. under the trademark GORE-TRET™ recirculation media. Advantages of this media are that it is very high in efficiency (e.g., in excess of 90% @ 0.3 μm) and also very permeable (e.g., less than 1 mm H$_2$O @ 10.5 fpm or 3.2 m/min). While this media loses its electrostatic efficiency while being washed with D.I. water, it immediately regains its efficiency upon drying due to the triboelectric effect of the mix of fibers.

Other filter materials of high efficiency and low resistance to air flow can also be used such as electrets or other triboelectret combinations. Any of these materials may be washable to remove ions, and the hydrophobicity of the sorbent core matrix would allow D.I. water washing and still protect water soluble chemisorbents within the sorbent core structure.

An outer protective layer can also be used to add durability to the filter and to contain any protruding fibers from either the triboelectric filter media or the filter support media for the expanded PTFE filter media. Typically, this would be an extruded or expanded plastic material of polypropylene, polyamide, polyester, porous polytetrafluoroethylene, etc. Alternatively it could be a knit, woven or non-woven material. A preferred material is a Delnet 0707 expanded polypropylene material available from Applied Extrusion Technologies, Inc., Middletown, Del.

The outer perimeter seal can be a heat seal of the thermoplastic or thermoset layers of construction on an ultrasonic seal of the same layers. Alternately, a sealant could be added, but cam should be exercised to avoid any seal material that may outgas during manufacturing or in use, as it would tend to degrade the adsorbent contained in the filter. A preferred seal can be obtained with a Dukane 20 Khz ultrasonic welder model 48D2001P operating at 1000 watts with a 1.5:1 booster and a 2.0 inch diameter high gain circular horn. A weld for 0.3 second hold time at a pressure of 2380 psi on the perimeter followed by a 0.5 second hold or cooling time effects an adequate seal with the expanded PTFE filter media and a 1.0 oz/yd Reemay 2014 polyester nonwoven support layer and a polypropylene Delnet 0707 cover screen.

Without intending to limit the scope of the present invention, the following examples illustrate how the present invention may be made and used:

EXAMPLE 1

A 70 wt % activated carbon and 30 wt % PTFE adsorbent core was made by the following method: 6874 g. of Calgon PCB-G carbon and 69,800 g. of deionized H$_2$O was mixed in a 115 liter baffled stainless container. While the slurry was agitating, 2610 g. of PTFE in the form of a 24.8% aqueous dispersion was rapidly poured into the vessel. The PTFE dispersion used was AD-059 obtained from ICI Americas, Inc. The mixture coagulated within 1 minute and after 2½ minutes, the mixer was stopped. The coagulum settled to the bottom, and the effluent was clear.

The coagulum was dried at 160° C. in a convection oven. The dried cake was chilled below 0° C. It was hard ground through a 635 cm stainless mesh screen. Next, 0.701 g. of mineral spirits was added per gram of filled powder. The mixture was chilled, passed through a screen again, tumbled then allowed to sit for greater than 16 hours at ambient.

A 10.6 cm diameter pellet was formed in a cylinder at 860 psi. The pellet was heated approximately 16 hours at 49° C. The pellet was then extruded into a tape. The tape was then calendered between heated rolls to a thickness of 0.127 cm. The bulk of the lubricant was evaporated by running the tape across heated rollers. The partially dried tape was then solvent extracted in isopropanol in a sonicated bath. The isopropanol was removed in a vacuum oven.

Some of the tape was then needled in a reciprocating needle press with needleboard. The needleboard is about 1 inch (2.54 cm) thick with approximately 3 inch (7.6 cm) long needles spaced approximately 0.375"(0.95 cm) apart in a staggered pattern such that as material is advanced through the press, the needles do not hit duplicating locations on subsequent cycles. The material was advanced about ⅛ inch (0.3 cm) per cycle, and the needle press operated at about 90 cycles/minute. This tape could then be slit to width by running it through a blade box.

For experimentation, however, some of the tape was needled by hand with a 0.6 mm diameter needle where number of holes could be easily controlled. Samples were made up using 1X and 2X holes to study dependence of particle filtration or clean up as a function of number of holes. Core size was also varied as was filter media/protective layer constructions. The following samples were made up:

All samples were made to a width of 0.40 inches (10.2 mm) and length of 0.92 inches (23.4 mm). Thickness varied by construction. All samples used the carbon/PTFE composite material described in the example. The density of the adsorbent core was 0.75 g/cc.

The first sample designated as "SFM/LNF" was made using the above mentioned core needled with 90 holes. The size of the core was 0.32 inches (8.1 mm) by 0.86 inches (21.8 mm). The filter media was an expanded PTFE membrane made in accordance to U.S. Pat. No. 4,902,423. The membrane was supported by a layer of 2014 Reemay and 0707 Delnet and ultrasonically sealed as previously disclosed. This sample in the graphs is also designated as "SFM/LNF/2XH."

The second sample designated as "SFM/SNF" was made identical to the first sample except that the size of the adsorbent core used was 0.23 inches (5.8 mm) by 0.75 inches (19.1 mm), and the number of holes was subsequently reduced to 80.

The third sample designated as "SFM/LNF/1XH" was made identical to the first sample only there were only 52 holes.

The fourth sample designated as "GT/LNF" used a core identical to the core used in the first sample. The filter media was GORE-TRET™ recirculation filter media, and it was supported with 0707 Delnet and sealed under the same conditions as previous samples.

The fifth sample designated as "GT/SNF" was identical to the fourth sample except the size of the adsorbent core used was 0.23 inches (5.8 mm) by 0.75 inches (19.1 mm), again with 80 holes.

A sixth sample used for comparison was a filter of the same size (0.40 inches by 0.92 inches) made from GORE-TEX® superflow recirculation media commercially available from W. L. Gore & Associates, Inc., Elkton, Md., and is basically the same expanded PTFE membrane used in samples one, two and three that has been laminated to a nonwoven polyester support layer. This was used as a comparison for filtration cleanup study within a hard disk drive because this type study is well known, and this is one of the standard recirculation filters in the industry.

The test used a 3.5 inch format hard disk drive that is challenged with an air stream containing 0.3 µm polystyrene latex spheres available from Duke Scientific Corp., Palo Alto, Calif. The spheres are put into an aqueous solution and put into an airstream via a nebulizer available from TSI, Inc., Minneapolis, Minn. A 1.0 cc/sec air stream was extracted from the drive and sampled with an LAS-X Laser Aerosol Spectrometer manufactured by Particle Measuring Systems, Boulder, COLO. The system was set up and stabilized such that the particle counter was counting about 10,000 particles per 8 second counting interval. The nebulizer was then turned off, and the output from the particle counter monitored how fast the drive cleaned up. Note that the drives were running so that the spinning disks were moving air through the filters to clean up the air in the drive. Also, it should be noted that the air being sampled by the particle counter is put through a filter and then put back into the drive. Thus, the drive would get clean simply by the act of sampling the air. Thus in each test, a no filter test is run to get a base line of how fast a drive cleans up without any filter.

Figure 5:
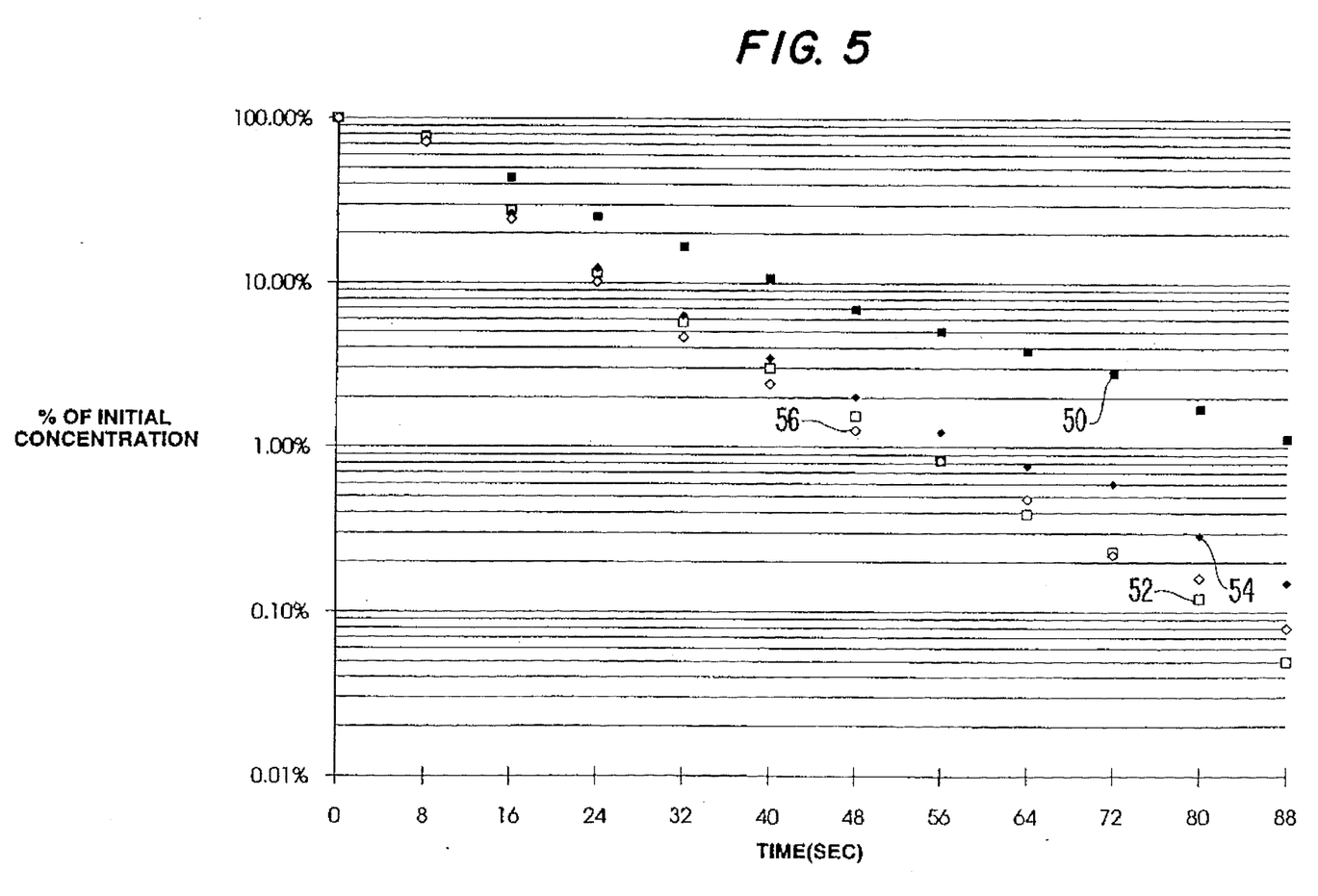
FIG. 5 is a graph plotting change in percentage of initial concentration of contaminants (at 0.3 micron) against time comparing the effect of the size of carbon/PTFE composite layer of the present invention.
Figure 6:
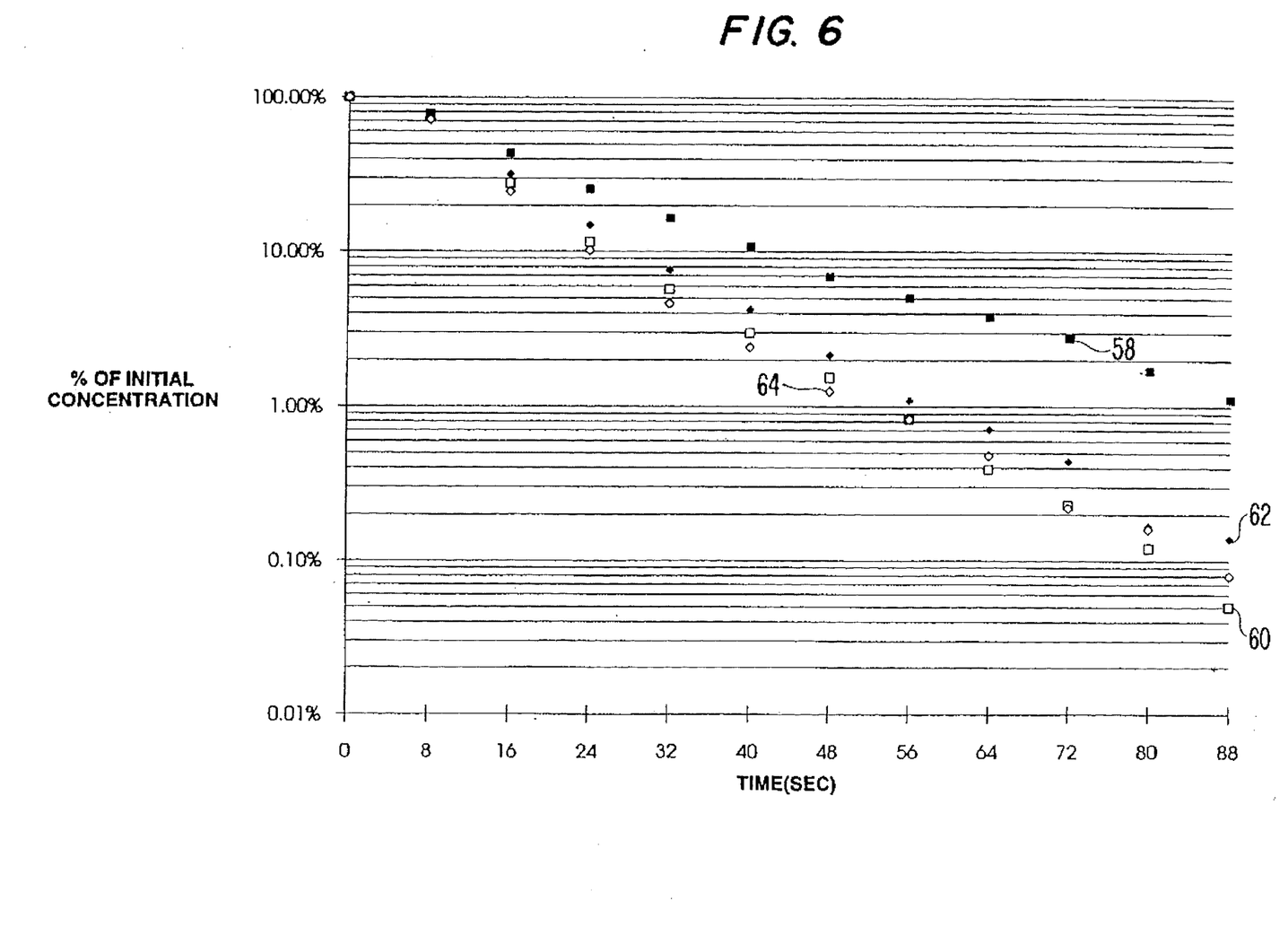
FIG. 6 is a graph plotting change in percentage of initial concentration of contaminants (at 0.3 micron) against time comparing the effect of different filter media layers of the present invention.
Figure 7:
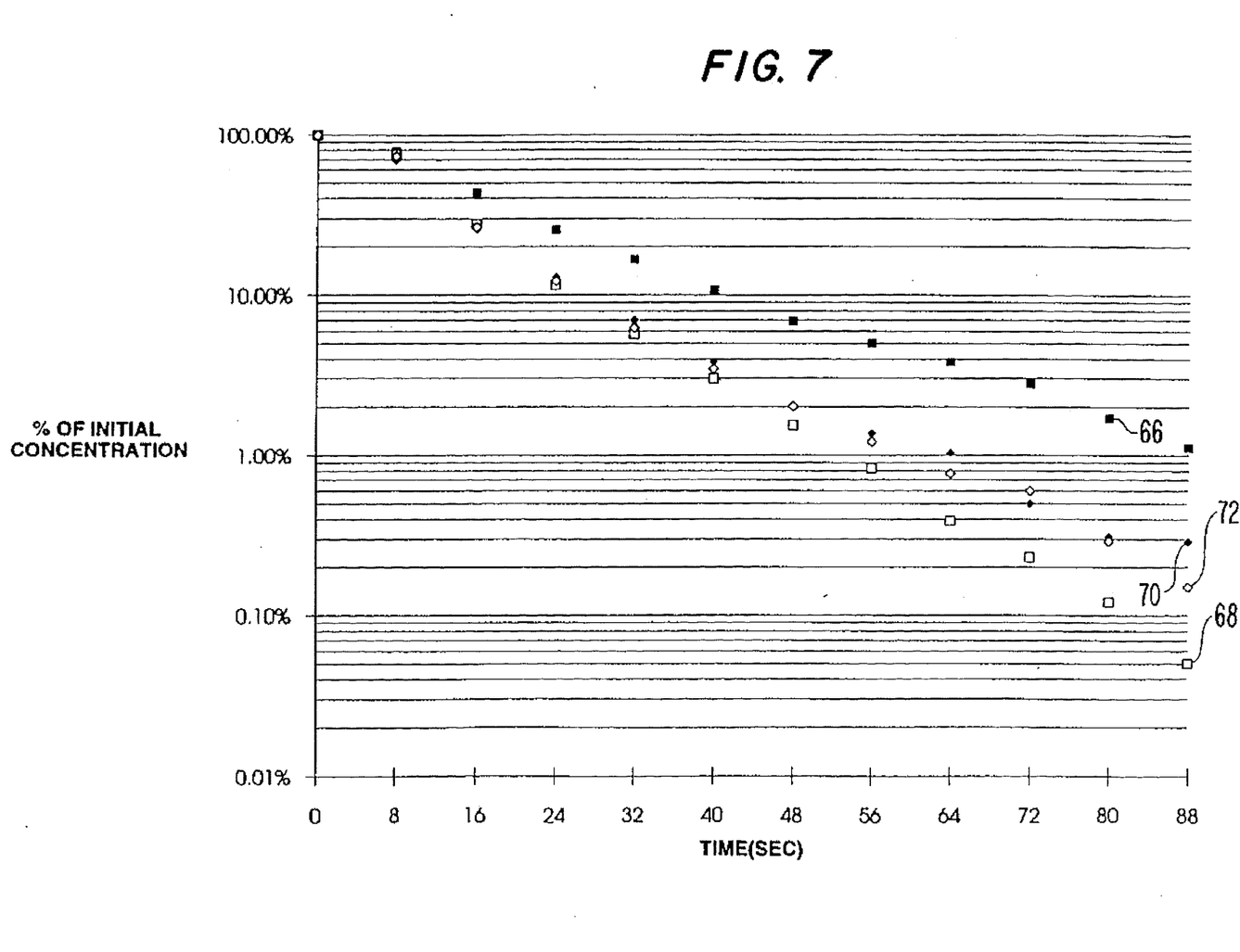
FIG. 7 is a graph plotting change in percentage of initial concentration of contaminants (at 0.3 micron) against time comparing the effect of small needle holds frequency on various samples of the present invention.

These samples were tested and compared for performance, and the results are plotted in the graphs of FIGS. 5, 6 and 7. The graph of FIG. 5 plots the concentration of contaminants over time of no filter 50, the standard recirculation media 52, Sample 1 SFM/LNF 54, and Sample 2 SFM/SNF 56. These results demonstrate that drive clean up for particles increases as adsorbent size core decreases.

FIG. 6 plots the concentration over time of no filter 58, the standard recirculation media 60, Sample 2 SFM/SNF 62, and Sample 5 GT/SNF 64. These results demonstrate the performance of the two different filtration media, showing that both work and that in this particular drive the membrane outperformed the triboelectret.

FIG. 7 plots concentration over time for no filter 66, a standard recirculation filter 68, Sample 1 SFM/LNF/2XH 72 and Sample 3 SFM/LNF/1XH 70. These results demonstrate that drive cleanup for particles increases with the number of holes in the adsorbent core.

All of the above samples were washed in D.I. water and inspected for deterioration and none was seen.

These tests show a number of results. First and foremost, it shows that the filler of the present invention is clean and washable while satisfactorily performing particle filtration to a level not previously available. Second, it shows that particle cleanup increases with the number of needle holes or with smaller adsorbent core size. Since the amount of adsorbent varies more with adsorbent core size than with displacement of adsorbent core accomplished by needling, the preferred embodiment would keep the adsorbent core size large and the number of needle holes large. All constructions are clean, low particulating, low outgassing, and washable.

In summary, the present invention provides a thin clean, low outgassing, low particulating, D. I. water washable adsorbent recirculation filter that has a high adsorbent loading and good particle filtration cleanup performance that has never before been available. Although the above description and examples were primarily directed to production of a filter for use in a computer disk drive application, the present invention can be used in many other applications, for example, electronic control boxes, automobile filters such as compartment filters and filters for the car interior, optical equipment, etc., that can use air movement from existing moving parts, an additional fan or simply air movement by convection, diffusion, etc.

While particular embodiments of the present invention have been illustrated and described herein, the present invention should not be limited to such illustrations and descriptions. It should be apparent that changes and modifications may be incorporated and embodied as part of the present invention within the scope of the following claims.

We claim:

1. A sorbent filter for selectively sorbing contaminants present in an environment, the filter having a height, depth and length, the sorbent filter comprising:

at least one protective support layer;

at least one filter layer;

an inner sorbent core, the core including a soluble sorbent therein for removing contaminants from the environment;

wherein the support layer and the filter layer cover the core and allow the filter to be washed without removing sorbents from the core.

2. The filter of claim 1 wherein the filter includes a perimeter seal sealing the filter layer and the protective support layer around the sorbent core.

3. The filter of claim 1 wherein the filter layer comprises at least one layer of porous expanded polytetrafluoroethylene.

4. The filter of claim 1 wherein the soluble sorbent comprises a chemisorber.

5. The filter of claim 1 wherein the soluble sorbent comprises a physisorber.

6. The filter of claim 1 wherein the filter layer includes a filler selected from the group consisting of an electret material and a triboelectret material.

7. The filter of claim 1 wherein the filter layer comprises a triboelectric filter comprising a mixture of polytetrafluoroethylene fibers and polyamide fibers.

8. The filter of claim 1 wherein:

the support layer comprises at least two layers, one layer mounted on a top side of the filter and a second layer mounted on a bottom side of the filter; and the filter layer comprises at least two layers, one layer mounted on the top side of the filter between the support layer and the sorbent core and the second layer mounted on the bottom side of the filter between the support layer and the sorbent core.

9. The filter of claim 8 wherein the sorbent core comprises a combination of polytetrafluoroethylene and a sorbent filler.

10. The filter of claim 9 wherein the sorbent core is needled to improve air flow therethrough.

11. The filter of claim 8 wherein a perimeter seal is provided attaching the top support layer and filter layer to the bottom support layer and filter layer.

12. The filter of claim 1 wherein the support layer is selected from at least one of the group consisting of an expanded polyethylene, woven polyethylene, polyester, polypropylene, and porous polytetrafluoroethylene.

13. The filter of claim 1 wherein the sorbent core comprises an ion exchange resin.

14. The filter of claim 1 wherein the sorbent core comprises a catalyst.

15. A sorbent recirculation filter for selectively sorbing contaminants present within an enclosed environment housing sensitive equipment that comprises:

an inner sorbent core having soluble sorbent material therein; and a hydrophobic cover surrounding the core, the cover including a filtration layer comprising a hydrophobic porous expanded polytetrafluoroethylene;

wherein the core and cover combine to provide a filter that can be washed to remove ionic contamination without damaging the sorbent material.

16. The filter of claim 15 wherein the sorbent core comprises a combination of polytetrafluoroethylene and a sorbent filler.

17. The filter of claim 15 wherein the sorbent core is needled to improve air flow therethrough.

18. The filter of claim 15 wherein the filter includes a perimeter seal sealing the hydrophobic cover around the sorbent core.

* * * * *